(12) United States Patent
Soldati et al.

(10) Patent No.: US 10,631,325 B2
(45) Date of Patent: Apr. 21, 2020

(54) NETWORK NODES AND METHODS THEREOF

(71) Applicant: Huawei Technologies Co., Ltd., Shenzhen (CN)

(72) Inventors: Pablo Soldati, Kista (SE); Peter Legg, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/990,292

(22) Filed: May 25, 2018

(65) Prior Publication Data

US 2018/0279355 A1 Sep. 27, 2018

Related U.S. Application Data

(63) Continuation of application No. PCT/EP2015/077868, filed on Nov. 27, 2015.

(51) Int. Cl.
*H04W 72/12* (2009.01)
*H04W 74/08* (2009.01)
(Continued)

(52) U.S. Cl.
CPC ....... *H04W 72/1289* (2013.01); *H04W 16/14* (2013.01); *H04W 72/1215* (2013.01);
(Continued)

(58) Field of Classification Search
CPC ......... H04W 72/1215; H04W 72/1242; H04W 72/1252; H04W 74/0816; H04W 72/1289; H04W 16/32; H04W 28/26
See application file for complete search history.

(56) References Cited

U.S. PATENT DOCUMENTS

2004/0047319 A1* 3/2004 Elg .............. H04W 74/02
370/338
2010/0195664 A1 8/2010 Ho
(Continued)

FOREIGN PATENT DOCUMENTS

CN 102711142 A 10/2012
CN 103686701 A 3/2014
CN 105103624 B 3/2019

OTHER PUBLICATIONS

"IEEE Standard for Information technology—Telecommunications and information exchange between systems,Local and metropolitan area networks—Specific requirements, Part 11: Wireless LAN Medium Access Control (MAC) and Physical Layer (PHY) Specifications," IEEE Std 802.11™—2012, Institute of Electrical and Electronics Engineers, New York, New York (2012).
(Continued)

*Primary Examiner* — Brian D Nguyen
(74) *Attorney, Agent, or Firm* — Leydig, Voit & Mayer, Ltd.

(57) ABSTRACT

The present disclosure relates to a first network node. The first network node comprises a transceiver configured to receive a network information message from a second network node configured to use a shared communication channel for wireless communication, the network information message indicating a set of third network nodes configurable (or contending) to use the shared communication channel for wireless communication; a processor configured to determine, for the second network node, at least one first channel access time interval for accessing the shared communication channel based on the network information message; wherein the transceiver further is configured to transmit a first network control message to the second network node, the first network control message indicating the first channel access time interval for accessing the shared com-
(Continued)

munication channel. Furthermore, the present disclosure also relates to corresponding method, a wireless communication system, a computer program, and a computer program product.

20 Claims, 5 Drawing Sheets

(51) Int. Cl.
*H04W 16/14* (2009.01)
*H04W 28/26* (2009.01)
(52) U.S. Cl.
CPC ... *H04W 72/1242* (2013.01); *H04W 72/1252* (2013.01); *H04W 74/0816* (2013.01); *H04W 28/26* (2013.01)

(56) References Cited

U.S. PATENT DOCUMENTS

| | | | |
|---|---|---|---|
| 2013/0072208 A1 | 3/2013 | Marinier et al. | |
| 2014/0078970 A1 | 3/2014 | Guo et al. | |
| 2014/0314003 A1 | 10/2014 | Zhou et al. | |
| 2014/0328264 A1 | 11/2014 | Merlin et al. | |
| 2015/0045032 A1 | 2/2015 | Tomici et al. | |
| 2015/0092573 A1* | 4/2015 | Zhang | H04W 24/10 370/252 |
| 2015/0119059 A1* | 4/2015 | Miao | H04W 16/10 455/452.1 |
| 2015/0341821 A1 | 11/2015 | Hong et al. | |
| 2016/0150357 A1* | 5/2016 | Jung | H04W 52/0206 455/41.1 |
| 2016/0183147 A1* | 6/2016 | Da Silva | H04W 36/0055 370/331 |
| 2016/0227416 A1* | 8/2016 | Suzuki | H04W 72/0453 |
| 2016/0330765 A1* | 11/2016 | Levy | H04W 74/04 |
| 2016/0360422 A1 | 12/2016 | Zhang et al. | |
| 2017/0105221 A1* | 4/2017 | Ahluwalia | H04W 16/14 |
| 2017/0181153 A1* | 6/2017 | Choi | H04B 7/0417 |

OTHER PUBLICATIONS

Sadek et al., "Extending LTE to Unlicensed Band—Merit and Coexistence", IEEE ICC 2015—Workshop on LTE in Unlicensed Bands: Potentials and Challenges, Institute of Electrical and Electronics Engineers, New York, New York (2015).

* cited by examiner

NIM

NCM1(NCM2)

NETWORK NODES AND METHODS THEREOF

CROSS-REFERENCE TO RELATED APPLICATIONS

This application is a continuation of International Application No. PCT/EP2015/077868, filed on Nov. 27, 2015, the disclosure of which is hereby incorporated by reference in its entirety.

TECHNICAL FIELD

The present disclosure relates to a first network node and a second network node for wireless communication systems. Furthermore, the present disclosure also relates to corresponding methods, a wireless communication system, a computer program, and a computer program product.

BACKGROUND

Radio access networks are rapidly becoming increasingly denser and heterogeneous as we move towards 5G. In the future, architectures of Single Radio Access Network (SRAN) will support Heterogeneous Network (HetNet) deployments in which a so called anchor node (for example, an Long Term Evolution (LTE) eNodeB) provides wide area coverage and signalling connectivity, whilst subtended small cells provide high bandwidth user plane links to users. Small cells of different Radio Access Technologies (RATs) and using different spectrum (included unlicensed spectrum) may be attached to the anchor node. In particular, in 3GPP LTE Rel-12 and currently in Rel-13, different realisations of this concept have or are being standardised. In Rel-12 Dual Connectivity (also known as LTE Multiple Stream Aggregation (MSA)) was introduced wherein both macro and small cell nodes belong to LTE, whilst in Rel-13 there are work items to standardise LTE and Wireless Local Area Network (WLAN) interworking, such as LTE-WiFi Aggregation (LWA), and License Assisted Access (LAA), respectively.

For LTE/WLAN interworking, Rel-12 specifications have introduced an Access Network Selection (ANS) mechanism for LTE/WLAN traffic steering. The User Equipment (UE) offloading decision is taken by based on assistance parameters that are provided by the cellular network. In that sense, decision thresholds with respect to signal strength/quality, load, etc. determine the condition to be met for steering traffic from and to the WLAN. Additional integration enhancements are currently considered for standardization in LTE Rel-13. These include fully network-controlled LTE/WLAN traffic steering (also known as LTE WLAN Interworking (LWI)) or even downlink LTE-WLAN Aggregation (LWA) that allows UEs to concurrently receive data from both RATs. The LWA design draws many aspects from LTE Dual Connectivity (DC). To improve the capacity of the Downlink (DL) WiFi, the Uplink (UL) WiFi Medium Access Control (MAC) control frames are sent over LTE (encapsulated by the RRC protocol), and no UL user plane is mapped to WiFi.

Regulations for accessing unlicensed spectrum require a communication device to "listen before talk", i.e. the communication device shall assess whether the channel is already occupied by another communication device's transmission prior to transmitting itself. WiFi is today's most widely deployed technology operating in unlicensed spectrum. The WiFi system is based on the IEEE 802.11 family of standards which exploits Carrier Sense Multiple Access with Collision Avoidance (CSMA/CA) to enable uncoordinated spectrum access among WiFi Access Points (APs) and WiFi stations.

Once a transmitter has been cleared to transmit by the CSMA/CA procedure, the transmitter waits for an Inter-Frame Spacing (IFS) time prior to transmitting a data frame comprising a physical layer preamble followed by a MAC Service Data Unit (MSDU) with related MAC. Upon successfully receiving a data frame requiring acknowledgment (ACK), the transmission of the ACK frame shall commence after a Short IFS (SIFS) period, without regard to the busy/idle state of the medium. The acknowledgment is further protected by an additional inter-frame space after its transmission is concluded. Other stations (such as a user or a user device) and APs shall defer accessing the channel for the whole duration of the data frame and acknowledgment transmission (including the inter-frame spacing), and at the end of this period a backoff mechanisms is started using a certain contention window. Through Clear Channel Assessment (CCA), a communication device detects whether the medium busy when the Carrier Sense/Clear Channel Assessment (CS/CCA) mechanism detects a channel busy condition. A channel busy condition is detected when the Received Signal Strength (RSS) is equal to or greater than the minimum modulation and coding rate sensitivity (i.e. −82 dBm for 20 MHz channel spacing, −85 dBm for 10 MHz channel spacing, and −88 dBm for 5 MHz channel spacing).

The CCA/CA mechanisms avoids collisions among transmissions of APs operating in the same channel by deferring the transmission of an AP whenever another AP, whose RSS exceed the CCA sensitivity threshold, starts transmitting. For downlink LWA, wherein the UL WiFi MAC control frames are sent by the UE over LTE and no UL user plane is mapped to WiFi, the CCA threshold can significantly impact the DL throughput. When two APs operating in the same unlicensed channel are sufficiently isolated (e.g., sufficiently distant from one other, or with sufficient channel attenuation in between) so that the respective RSS does not exceed the sensitivity threshold, the APs can simultaneously access the channel without colliding. On the other hand, when APs can detect each other transmission with RSS exceeding the CCA sensitivity threshold, the APs share the channel access over time using CSMA/CA, but transmission collisions may occur when backoff timer expires for both APs at the same time. During a collision the likelihood of decoding the frames correctly at the recipient STAs (stations) is low. Furthermore, after a collision the backoff window of the AP is increased so the (idle) time interval between successive frame transmissions increases. This may significantly affect the throughput/capacity of the WiFi network since WiFi APs are refrained to transmit when the channel is busy.

SUMMARY

An objective of embodiments of the present disclosure is to provide a solution which mitigates or solves the drawbacks and problems of conventional solutions.

Another objective of embodiments of the present disclosure is to provide a solution for coordinating and prioritizing channel access among network nodes configurable (or contending) to use a shared communication channel for wireless communication.

An "or" in this description and the corresponding claims is to be understood as a mathematical OR which covers "and" and "or", and is not to be understood as an XOR (exclusive OR).

The above objectives and further objectives are achieved by the subject matter of the independent claims. Further advantageous implementation forms of the present disclosure are defined by the dependent claims.

According to a first aspect of the disclosure, the above mentioned and other objectives are achieved with a first network node for a wireless communication system, the first network node comprising a transceiver configured to receive a network information message from a second network node configured to use a shared communication channel for wireless communication, the network information message indicating a set of third network nodes configurable (or contending) to use the shared communication channel for wireless communication;

a processor configured to determine, for the second network node, at least one first channel access time interval for accessing the shared communication channel based on the network information message (e.g. if the shared communication channel is determined by the processor to be non-congested);

wherein the transceiver further is configured to transmit a first network control message to the second network node, the first network control message indicating the first channel access time interval for accessing the shared communication channel.

The expression "configurable to" in the above sense means that a network node can use (has the technical capabilities of using) the shared communication channel but might or might not use the shared communication channel. On the other hand, the expression "configured to" in this sense means that the network node will use the shared communication channel if the network node is assigned proper radio resources, such as channel access time intervals.

The meaning of "contending to use" in the above sense is that the second network node and the set of third network nodes are contending for accessing the shared communication channel. This is for example the case in WLAN wherein the access to radio resources of a shared communication channel is not regulated by a scheduler but network nodes contend with one other by assessing whether the channel is not already used.

The channel access time interval(s) can be configured for network nodes within a given time horizon H, with the configuration being applied over time periodically with period H in a duty cycle manner. Different time horizons or time periodicity could be applied to different network nodes.

Moreover, the at least one first channel access time interval may be conditioned to be determined if the shared communication channel is determined to be non-congested. Therefore, the processor of the first network node may further be configured to determine whether the shared communication channel is congested or non-congested based on the network information message and use the said determination. In one exemplifying case, the shared communication channel is determined to be congested if the network information message reports a channel utilization that exceed a threshold. Alternatively, a shared communication channel may be determined as congested based on the number of user devices and/or network nodes contending to access the shared communication channel. In such a case the processor may not determine the first channel access time interval for accessing the congested shared communication channel. Instead the processor may determine a further non-congested shared communication channel and a channel access time interval for this further shared communication channel (as explained further down).

A number of advantages are provided by a first network node according to the first aspect.

An advantage of the solution according to the first aspect is that a centralized coordination for prioritizing channel access of network nodes is provided since the first network node determines the first channel access time interval for the second network node based on the network information message. The solution is applicable to coordinate channel access either in downlink (i.e., transmission from network nodes to user devices) or in uplink (i.e., transmission from user devices to network nodes). The solution has the further advantage of reducing transmission collisions thereby improving spectral efficiency. This is because collisions can lead to errored data frames and additionally to increases to the backoff window (i.e. exponential backoff). The solution according to the first aspect is especially beneficial when the second network node and the set of third network nodes are configured to operate in the unlicensed spectrum.

In a first possible implementation form of a first network node according to the first aspect, the network information message further indicates the traffic load of the shared communication channel and/or the traffic load of the second network node in the shared communication channel. Accordingly, the determination of the at least one first channel access time interval is based on the indicated set of third network nodes and the traffic load(s).

An advantage with the first possible implementation form is that it enables the first network node to weigh the relevance of different network nodes, i.e. the second network node and the set of third network nodes, when determining channel access time intervals and the associated channel access priorities. In one example, network access nodes with high traffic load can be granted a longer channel access time interval and/or higher channel access priority. Additionally, this has the advantage to enable the first network node to determine the allocation of channel access time intervals and channel access priorities based on fairness criteria. Therefore, improved system spectral efficiency is achieved.

In a second possible implementation form of a first network node according to the first implementation form of the first aspect, the traffic load is any of number of users communicating in the shared communication channel, traffic per network node communicating in the shared communication channel, indication of channel utilization of the shared communication channel, and channel idle time of the shared communication channel.

An advantage with the second possible implementation form is that it enables the first network node to weigh the relevance of different network nodes based on the number of served users, the traffic load of the network node relative to other network nodes using the shared communication channel, and the utilization of the shared communication channel. Therefore, improved system spectral efficiency is achieved.

In a third possible implementation form of a first network node according to any of the preceding implementation forms of the first aspect or to the first aspect as such, the processor further is configured to determine at least one further shared communication channel for the second network node based on the network information message (if the shared communication channel is determined to be congested), determine at least one further channel access time interval for accessing the further shared communication channel based on the network information message;
wherein the transceiver further is configured to
transmit the first network control message indicating the further shared communication channel and the further channel access time interval for accessing the further shared communication channel.

An advantage with the third possible implementation form is that it enables the first network node to configure the second network node to communicate in a shared communication channel. This is particularly beneficial when the shared communication channel in use by the second network node is determined to be congested. Additionally, this has the advantage to enabling the first network node to balance the load of different shared communication channels, thereby reducing the probability of transmission collision in each communication channel and improving spectral efficiency.

In a fourth possible implementation form of a first network node according to any of the preceding implementation forms of the first aspect or to the first aspect as such, the processor further is configured to
determine at least one first channel access priority associated with the first channel access time interval based on the network information message;
wherein the transceiver further is configured to
transmit the first network control message further indicating the first channel access priority.

An advantage with the fourth possible implementation form is that it enables the first network node to configure the second network node with a channel access priority regulating its access to the shared communication channel within a channel access time interval. Additionally, this has the advantage to enable the first network node to determine a priority order for other network nodes to access the shared communication channel within a channel access time interval thereby reducing the probability transmission collisions compared to an uncoordinated channel access of the related art and improving spectral efficiency.

In a fifth possible implementation form of a first network node according to any of the preceding implementation forms of the first aspect or to the first aspect as such, the first channel access priority grants a channel access probability p between zero and one.

An advantage with the fifth possible implementation form is that when the second network node is granted non-exclusive channel access priority, p=(0,1) or 0<p<1, within a time interval, the solution has the advantage to reduce the probability of transmission collisions compared to an uncoordinated channel access of the related art, thereby improving spectral efficiency.

In a sixth possible implementation form of a first network node according to the fifth implementation form of the first aspect, the first channel access priority grants a channel access probability p that is either zero or one. This means therefore exclusive channel access, i.e. p=0 or 1, or within a channel access time interval.

An advantage with the sixth possible implementation form is that when the second network node is granted exclusive channel access priority within a time interval, the solution has the advantage to avoid transmission collisions, thereby improving spectral efficiency even further.

In a seventh possible implementation form of a first network node according to any of the fourth to sixth implementation forms of the first aspect, the channel access priority is represented as a backoff window value associated with the channel access time interval or the shared communication channel.

An advantage with the seventh possible implementation form is that the resulting medium access scheme is backward compatible with the IEEE 802.11 MAC. Additionally, by enabling the first network node to configure the second network node with a proper backoff window value associated with the channel access time interval, the solution has the advantage to avoid transmission collisions, thereby improving spectral efficiency even further.

In an eighth possible implementation form of a first network node according to any of the fourth to sixth implementation forms of the first aspect, the channel access priority is represented as a backoff counter associated with the channel access time interval or the shared communication channel.

An advantage with the eighth possible implementation form is that the resulting medium access scheme is backward compatible with the IEEE 802.11 MAC. Additionally, by enabling the first network node to configure the second network node with a proper backoff counter value associated with the channel access time interval, the solution has the advantage to avoid transmission collisions, thereby improving spectral efficiency even further.

In a ninth possible implementation form of a first network node according to any of the fourth to sixth implementation forms of the first aspect, the channel access priority is represented as a probability distribution function of a backoff counter associated with the channel access time interval or the shared communication channel.

An advantage with the ninth possible implementation form is that the medium access scheme of the second network node can be optimized compared to traditional solutions such as the IEEE 802.11 MAC. Additionally, by enabling the first network node to configure the network access node with a proper probability distribution function of a backoff counter associated with the channel access time interval, the solution has the advantage to avoid transmission collisions, thereby improving spectral efficiency even further.

In a tenth possible implementation form of a first network node according to any of the preceding implementation forms of the first aspect or to the first aspect as such, the processor further is configured to
determine, for the second network node, at least one first channel idle time threshold based on the network information message;
wherein the transceiver further is configured to
transmit the first network control message further indicating the first channel idle time threshold.

An advantage with the tenth possible implementation form is that it enables the first network node to configure the second network node with a channel idle time threshold for opportunistically accessing the shared communication channel, thereby improving spectral efficiency.

In an eleventh possible implementation form of a first network node according to any of the preceding implementation forms of the first aspect or to the first aspect as such, the processor further is configured to
derive channel contention relations between the second network node and the set of third network nodes based on the network information message;
determine any of the first channel access time interval, the first channel access priority, the first channel idle time threshold, and the determined shared communication channel based on the derived channel contention relations and the network information message.

An advantage with the eleventh possible implementation form is that it enables the first network node to optimize the channel access parameter configuration of the second network node and the set of third network nodes based on the channel contention relations between the second network node and the set of third network nodes.

In a twelfth possible implementation form of a first network node according to any of the preceding implementation forms of the first aspect or to the first aspect as such, the processor further is configured to determine, for at least one third network node belonging to the set of third network nodes, at least one second channel access time interval for accessing the shared communication channel based on the network information message;

wherein the transceiver further is configured to transmit a second network control message to the third network node, the second network control message indicating the second channel access time interval.

An advantage with the twelfth possible implementation form it enables the first network node to coordinate and prioritize channel access of other network nodes. The solution has the further advantage of reducing transmission collisions between network nodes thereby improving spectral efficiency. The solution is especially beneficial when the second network node and the set of third network nodes are configured to operate in the unlicensed spectrum.

In a thirteenth possible implementation form of a first network node according to the twelfth implementation form of the first aspect, the processor further is configured to determine, for the third network node, at least one second channel access priority associated with the second channel access time interval based on the network information message;

wherein the transceiver further is configured to transmit the second network control message further indicating the second channel access priority.

An advantage with the thirteenth possible implementation form is that it enables the first network node to configure a third network node with a channel access priority regulating its access to the shared communication channel within a channel access time interval. Additionally, this has the advantage to enable the first network node to determine a priority order for other network nodes to access the shared communication channel within a channel access time interval thereby reducing the probability transmission collisions compared to an uncoordinated channel access of the related art and improving spectral efficiency.

In a fourteenth possible implementation form of a first network node according to the twelfth or thirteenth implementation form of the first aspect, the processor further is configured to determine, for the third network node, at least one channel idle time threshold based on the network information message;

wherein the transceiver further is configured to transmit the second network control message further indicating the second channel idle time threshold.

An advantage with the fourteenth possible implementation form is that it enables the first network node to configure the second network node with a channel idle time threshold for opportunistically accessing the shared communication channel, thereby improving spectral efficiency.

In a fifteenth possible implementation form of a first network node according to any of the twelfth to fourteenth implementation form of the first aspect, the processor further is configured to determine at least one shared communication channel for the third network node based on the network information message;

wherein the transceiver further is configured to transmit the second network control message further indicating the determined shared communication channel.

An advantage with the fifteenth possible implementation form is that it enables the first network node to configure the second network node to communicate in a shared communication channel. Additionally, this has the advantage to enabling the first network node to balance the load of different shared communication channels, thereby reducing the probability of transmission collision in each communication channel and improving spectral efficiency.

In a sixteenth possible implementation form of a first network node according to any of the twelfth to fourteenth implementation form of the first aspect, when dependent on the eleventh implementation form, the processor further is configured to determine any of the second channel access time interval, the second channel access priority, the second channel idle time threshold, and the determined shared communication channel based on the derived channel contention relations and the network information message.

An advantage with the sixteenth possible implementation form is that it enables the first network node to optimize the channel access parameter configuration of the second network node and the set of third network nodes based on the channel contention relations between the second network node and the set of third network nodes.

In a seventeenth possible implementation form of a first network node according to any of the preceding implementation forms of the first aspect or to the first aspect as such, the first network node is configured to operate in a first radio access technology, RAT, (such as 2G, 3G, 4G, 5G or any other mobile communication system technology) and the second network node is configured to operate in a second RAT (such as a wireless local area network).

An advantage with the seventeenth possible implementation form is that it enables network nodes operating in different RATs to coordinate to improve the system spectral efficiency.

In an eighteenth possible implementation form of a first network node according to any of the preceding implementation forms of the first aspect, the first network node is configured to operate in a licensed frequency band (e.g. a mobile communication frequency band) and the second network node is configured to operate in an un-licensed frequency band (e.g. a wireless local area network frequency band).

An advantage with the eighteenth possible implementation form is that it enables the first network node operating in a licensed frequency band to control, coordinate and optimize the channel access parameters and procedures of other network nodes (such as the second network node) configurable or contending to use a shared communication channel in an unlicensed frequency band. Additionally, this enables to improve the spectral efficiency of shared communication channels in unlicensed frequency bands.

In a nineteenth possible implementation form of a first network node according to any of the preceding implementation forms of the first aspect or to the first aspect as such, the first channel access time comprises any of a start channel access time, an end channel access time, a start channel access time offset with respect to a reference time, a channel access duration, and a channel access periodicity.

An advantage with the nineteenth possible implementation form is that it enables the first network node to configure channel access time parameters for the second network node or the set of third network node for controlling and coordination the corresponding channel access procedures.

According to a second aspect of the disclosure, the above mentioned and other objectives are achieved with a second network node for a wireless communication system, the second network node comprising
a processor configured to
determine a set of third network nodes configurable to (or contending to) use a shared communication channel for wireless communication;
a transceiver configured to
transmit a network information message to a first network node, the network information message indicating the set of third network nodes;
receive a first network control message from the first network node, the first network control message indicating at least one first channel access time interval for the second network node;
wherein the transceiver further is configured to
use the shared communication channel according to the first network control message.

A number of advantages are provided by a second network node according to the first aspect.

The solution according to the second aspect has the advantage of reducing transmission collisions among different network nodes configurable (or contending) to use a shared communication channel hereby improving spectral efficiency since the first network node determines the first channel access time interval for the second network node based on the network information message. The solution according to the second aspect is especially beneficial when the second network node and the set of third network nodes are configured to operate in the unlicensed spectrum.

In a first possible implementation form of a second network node according to the second aspect, the processor further is configured to
determine at least the traffic load of the shared communication channel or the traffic load of the second network node in the shared communication channel;
wherein the transceiver further is configured to
transmit the network information message further indicating the traffic load.

An advantage with the first possible implementation form is that it enables the second network to report information related to the usage of the shared communication channel to a first network node for coordinating the access to the shared communication channel for improved system spectral efficiency.

In a second possible implementation form of a second network node according to the first implementation form of the second aspect or to the second aspect as such, the first network control message further indicates at least one channel access priority associated with the first channel access time interval. Accordingly, the transceiver is configured to use the shared communication channel based on both the channel access priority and the first channel access time interval indicated in the first network control message.

An advantage with the second possible implementation form is that it enables the second network node to be configured with a channel access priority regulating its access to the shared communication channel within a channel access time interval. Thereby, the solution enables to reduce transmission collisions between the second network node and other network nodes configured (or contending) to use the shared communication channel within the same channel access time interval. Hence, the system spectral efficiency in the shared communication channel is improved.

In a third possible implementation form of a second network node according to the first or second implementation forms of the second aspect or to the second aspect as such, the first network control message further indicates a first channel idle time threshold; and
wherein the transceiver further is configured to
use the shared communication channel according to the first network control message if the shared communication channel is determined to be free for an interval of time at least equal to the first channel idle time threshold.

An advantage with the third possible implementation form is that it enables the second network node to opportunistically transmit data during a channel access time interval when prioritized network nodes do not any have data to transmit in the corresponding prioritized channel access time intervals. Thereby the spectral efficiency of the shared communication channel is improved.

In a fourth possible implementation form of a second network node according to any of the preceding implementation forms of the second aspect or to the second aspect as such, the first network node is configured to operate in a first radio access technology, RAT, (such as 2G, 3G, 4G, 5G or any other mobile communication system technology) and the second network node is configured to operate in a second RAT (such as a wireless local area network).

An advantage with the fourth possible implementation form is that it enables network nodes operating in different RATs to coordinate to improve the system spectral efficiency.

In a fifth possible implementation form of a second network node according to any of the preceding implementation forms of the second aspect, the first network node is configured to operate in a licensed frequency band (e.g. a mobile communication frequency band) and the second network node is configured to operate in an un-licensed frequency band (e.g. a wireless local area network frequency band).

An advantage with the fifth possible implementation form is that it enables the second network node when operating in an unlicensed frequency band to be configured with channel access parameters by a network node operating in a licensed frequency band to improve the spectral efficiency of shared communication channels in unlicensed frequency bands.

In a sixth possible implementation form of a second network node according to any of the preceding implementation forms of the second aspect or to the second aspect as such, the first channel access time comprises any of a start channel access time, an end channel access time, a start channel access time offset with respect to a reference time, a channel access duration, and a channel access periodicity.

An advantage with the sixth possible implementation form is that the second network node is configured with channel access time parameters for accessing the shared communication channel with reduced signalling overhead.

According to a third aspect of the disclosure, the above mentioned and other objectives are achieved with a method for a wireless communication system, the method comprising:
receiving a network information message from a second network node configured to use a shared communication channel for wireless communication, the network information message indicating a set of third network nodes configurable (or contending) to use the shared communication channel for wireless communication;

determining, for the second network node, at least one first channel access time interval for accessing the shared communication channel based on the network information message (if the shared communication channel is determined to be non-congested);

transmitting a first network control message to the second network node, the first network control message indicating the first channel access time interval for accessing the shared communication channel.

In a first possible implementation form of a method according to the third aspect, the network information message further indicates the traffic load of the shared communication channel or the traffic load of the second network node in the shared communication channel.

In a second possible implementation form of a method according to the first implementation form of the third aspect, the traffic load is any of number of users communicating in the shared communication channel, traffic per network node communicating in the shared communication channel, indication of channel utilization of the shared communication channel, and channel idle time of the shared communication channel.

In a third possible implementation form of a method according to any of the preceding implementation forms of the third aspect or to the third aspect as such, the method further comprises determining at least one further shared communication channel for the second network node based on the network information message (if the shared communication channel is determined to be congested), determining at least one further channel access time interval for accessing the further shared communication channel based on the network information message, transmitting the first network control message indicating the further shared communication channel and the further channel access time interval for accessing the further shared communication channel.

In a fourth possible implementation form of a method according to any of the preceding implementation forms of the third aspect or to the third aspect as such, the method further comprises determining at least one first channel access priority associated with the first channel access time interval based on the network information message;

transmitting the first network control message further indicating the first channel access priority.

In a fifth possible implementation form of a method according to any of the preceding implementation forms of the third aspect or to the third aspect as such, the first channel access priority grants a channel access probability p between zero and one.

In a sixth possible implementation form of a method according to the fifth implementation form of the third aspect, the first channel access priority grants a channel access probability p that is either zero or one.

In a seventh possible implementation form of a method according to any of the fourth to sixth implementation forms of the third aspect, the channel access priority is represented as a backoff window value associated with the channel access time interval or the shared communication channel.

In an eighth possible implementation form of a method according to any of the fourth to sixth implementation forms of the third aspect, the channel access priority is represented as a backoff counter associated with the channel access time interval or the shared communication channel.

In a ninth possible implementation form of a method according to any of the fourth to sixth implementation forms of the third aspect, the channel access priority is represented as a probability distribution function of a backoff counter associated with the channel access time interval or the shared communication channel.

In a tenth possible implementation form of a method according to any of the preceding implementation forms of the third aspect or to the third aspect as such, the method further comprises determining, for the second network node, at least one first channel idle time threshold based on the network information message;

transmitting the first network control message further indicating the first channel idle time threshold.

In an eleventh possible implementation form of a method according to any of the preceding implementation forms of the third aspect or to the third aspect as such, the method further comprises deriving channel contention relations between the second network node and the set of third network nodes based on the network information message;

determining any of the first channel access time interval, the first channel access priority, the first channel idle time threshold, and the determined shared communication channel based on the derived channel contention relations and the network information message.

In a twelfth possible implementation form of a method according to any of the preceding implementation forms of the third aspect or to the third aspect as such, the method further comprises determining, for at least one third network node belonging to the set of third network nodes, at least one second channel access time interval based for accessing the shared communication channel on the network information message;

transmitting a second network control message to the third network node, the second network control message indicating the second channel access time interval.

In a thirteenth possible implementation form of a method according to the twelfth implementation form of the third aspect, the method further comprises determining, for the third network node, at least one second channel access priority associated with the second channel access time interval based on the network information message;

transmitting the second network control message further indicating the second channel access priority.

In a fourteenth possible implementation form of a method according to the twelfth or thirteenth implementation form of the third aspect, the method further comprises determining, for the third network node, at least one channel idle time threshold based on the network information message;

transmitting the second network control message further indicating the second channel idle time threshold.

In a fifteenth possible implementation form of a method according to any of the twelfth to fourteenth implementation form of the third aspect, the method further comprises determining at least one shared communication channel for the third network node based on the network information message;

transmitting the second network control message further indicating the determined shared communication channel.

In a sixteenth possible implementation form of a method according to any of the twelfth to fourteenth implementation form of the third aspect, when dependent on the eleventh implementation form, the method further comprises determining any of the second channel access time interval, the second channel access priority, the second channel idle time threshold, and the determined shared communication channel based on the derived channel contention relations and the network information message.

In a seventeenth possible implementation form of a method according to any of the preceding implementation forms of the third aspect or to the third aspect as such, the first network node is configured to operate in a first radio access technology, RAT, (such as 2G, 3G, 4G, 5G or any other mobile communication system technology) and the second network node is configured to operate in a second RAT (such as a wireless local area network).

In an eighteenth possible implementation form of a method according to the seventeenth implementation form of the third aspect, the first network node is configured to operate in a licensed frequency band (e.g. a mobile communication frequency band) and the second network node is configured to operate in an un-licensed frequency band (e.g. a wireless local area network frequency band).

In a nineteenth possible implementation form of a method according to any of the preceding implementation forms of the third aspect or to the third aspect as such, the first channel access time comprises any of a start channel access time, an end channel access time, a start channel access time offset with respect to a reference time, a channel access duration, and a channel access periodicity.

According to a fourth aspect of the disclosure, the above mentioned and other objectives are achieved with a method for a wireless communication system, the method comprising:

determining a set of third network nodes configurable to [or contending to] use a shared communication channel for wireless communication;

transmitting a network information message to a first network node, the network information message indicating the set of third network nodes;

receiving a first network control message from the first network node, the first network control message indicating at least one first channel access time interval for the second network node;

using the shared communication channel according to the first network control message.

In a first possible implementation form of a method according to the fourth aspect, the method further comprises determining at least the traffic load of the shared communication channel or the traffic load of the second network node in the shared communication channel;

transmitting the network information message further indicating the traffic load.

In a second possible implementation form of a method according to the first implementation form of the fourth aspect or to the fourth aspect as such, the first network control message further indicates at least one channel access priority associated with the first channel access time interval.

In a third possible implementation form of a method according to the first or second implementation forms of the fourth aspect or to the fourth aspect as such, the first network control message further indicates a first channel idle time threshold; and the method further comprises using the shared communication channel according to the first network control message if the shared communication channel is determined to be free for an interval of time at least equal to the first channel idle time threshold.

In a fourth possible implementation form of a method according to any of the preceding implementation forms of the fourth aspect or to the fourth aspect as such, the first network node is configured to operate in a first radio access technology, RAT, (such as 2G, 3G, 4G, 5G or any other mobile communication system technology) and the second network node is configured to operate in a second RAT (such as a wireless local area network).

In a fifth possible implementation form of a second network node according to the fourth implementation form of the fourth aspect, the first network node is configured to operate in a licensed frequency band (e.g. a mobile communication frequency band) and the second network node is configured to operate in an un-licensed frequency band (e.g. a wireless local area network frequency band).

In a sixth possible implementation form of a second network node according to any of the preceding implementation forms of the fourth aspect or to the fourth aspect as such, the first channel access time comprises any of a start channel access time, an end channel access time, a start channel access time offset with respect to a reference time, a channel access duration, and a channel access periodicity.

The advantages of the methods according to the third aspect or the fourth aspect are the same as the corresponding network nodes according to the first and second aspects, respectively.

Embodiments of the present disclosure also relates to a computer program, characterized in code means, which when run by processing means causes said processing means to execute any method according to the present disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present disclosure will be apparent from the following detailed description.

BRIEF DESCRIPTION OF THE DRAWINGS

The appended drawings are intended to clarify and explain different embodiments of the present disclosure, in which.

DETAILED DESCRIPTION

Figure 1:
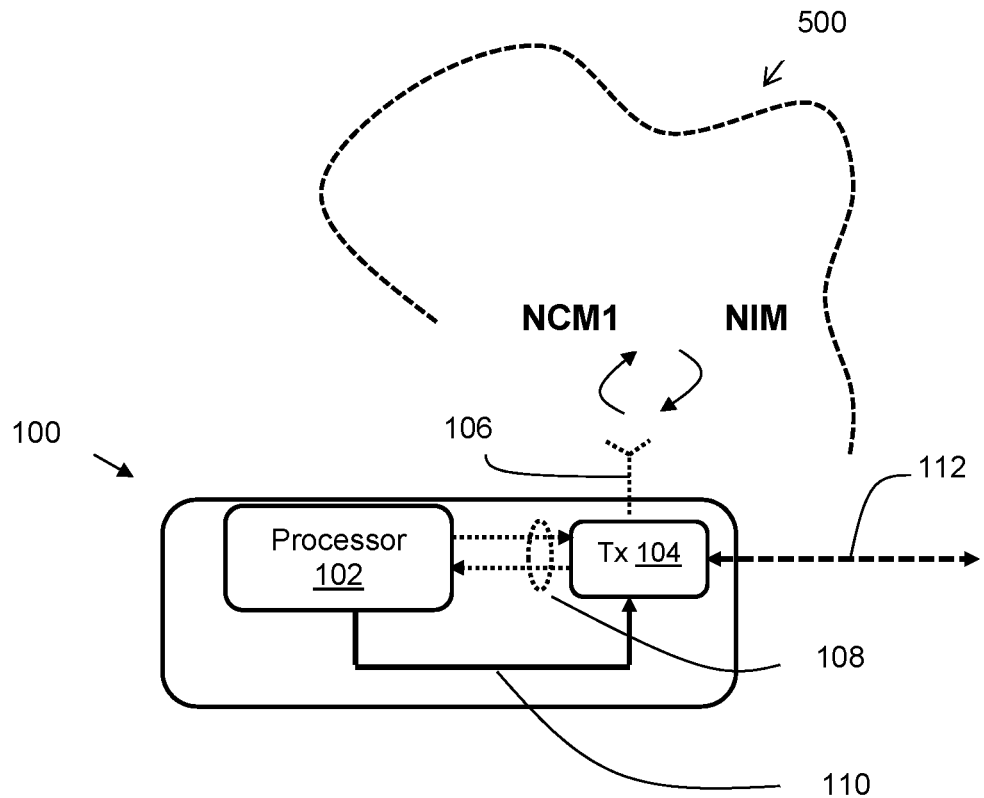
FIG. 1 shows a first network node according to an embodiment of the present disclosure.

FIG. 1 shows a first network node 100 according to an embodiment of the present disclosure. The first network node 100 comprises a processor 102 which is communicably coupled with communication means 108 to a transceiver 104 in this exemplary embodiment. The communication means 108 are illustrated as dotted arrows between the processor 102 and the transceiver 104 in FIG. 1. The communication means 108 are according to techniques well known in the art and may e.g. be used for transfer of data or control signalling between the processor 102 and the transceiver 104. The first network node 100 in this particular embodiment further comprises control means 110 by which the processor 102 operates (or controls) the transceiver 104. The control means 110 are illustrated with the black arrow from the processor 102 to the transceiver 104. The first network node 100 also comprises antenna means 106 coupled to the transceiver 104 for transmission and reception in the wireless communication system 500. The first network node 100 may also optionally have wired communication means 112 by which the first network node 100 can communicate with other network nodes or other network entities. The wired communication means 112 may e.g. be part of a backhaul system of the wireless communication system 500.

According to the present solution, the transceiver 104 of the first network node 100 is configured to receive a network information message NIM from a second network node 300 which is configured to use a shared communication channel for wireless communication. The network information message NIM indicates a set of third network nodes 300a, 300b, ..., 300z (see FIG. 7 and the corresponding text below) which are configurable or contending to use the shared communication channel for wireless communication. In the example in FIG. 1 the network information message NIM is received over a radio channel. However, the network information message NIM could also be received via the wired communication means 112. The network information message NIM is forwarded from the transceiver 104 to the processor 102 of the first network node 100 which is configured to determine, for the second network node 300, at least one first channel access time interval for accessing the shared communication channel based on the network information message NIM. The transceiver 104 is further configured to transmit a first network control message NCM1 to the second network node 300. The first network control message NCM1 indicates the first channel access time interval for accessing the shared communication channel, and may be transmitted according to a suitable transmission protocol.

According to a further embodiment of the present disclosure, the processor 102 is configured to determine first channel access time interval is the shared channel is determined to be non-congested.

Figure 2:
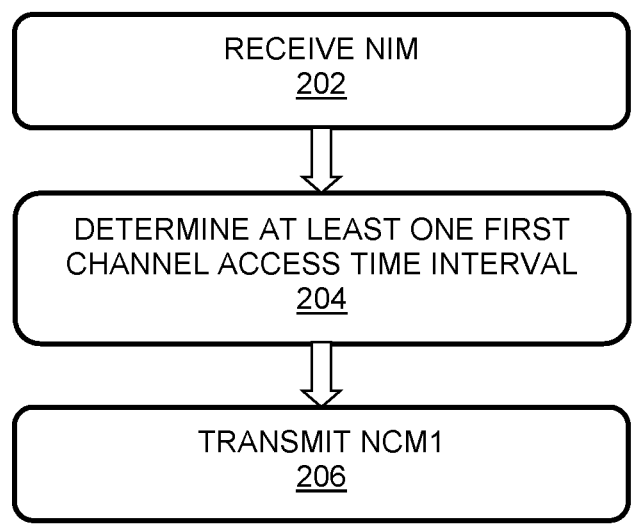
FIG. 2 shows a method according to an embodiment of the present disclosure.

FIG. 2 shows a corresponding method which may be implemented in a first network node 100, such as the one shown in FIG. 1. The method 200 comprises the step of receiving 202 a network information message NIM from a second network node 300 configured to use a shared communication channel for wireless communication. The network information message NIM indicates a set of third network nodes 300a, 300b, ..., 300z configurable (or contending) to use the shared communication channel for wireless communication. The method 200 further comprises the step of determining 204, for the second network node 300, at least one first channel access time interval for accessing the shared communication channel based on the network information message NIM. The method 200 finally comprises the step of transmitting 206 a first network control message NCM1 to the second network node 300. The first network control message NCM1 indicating the first channel access time interval.

Figure 3:
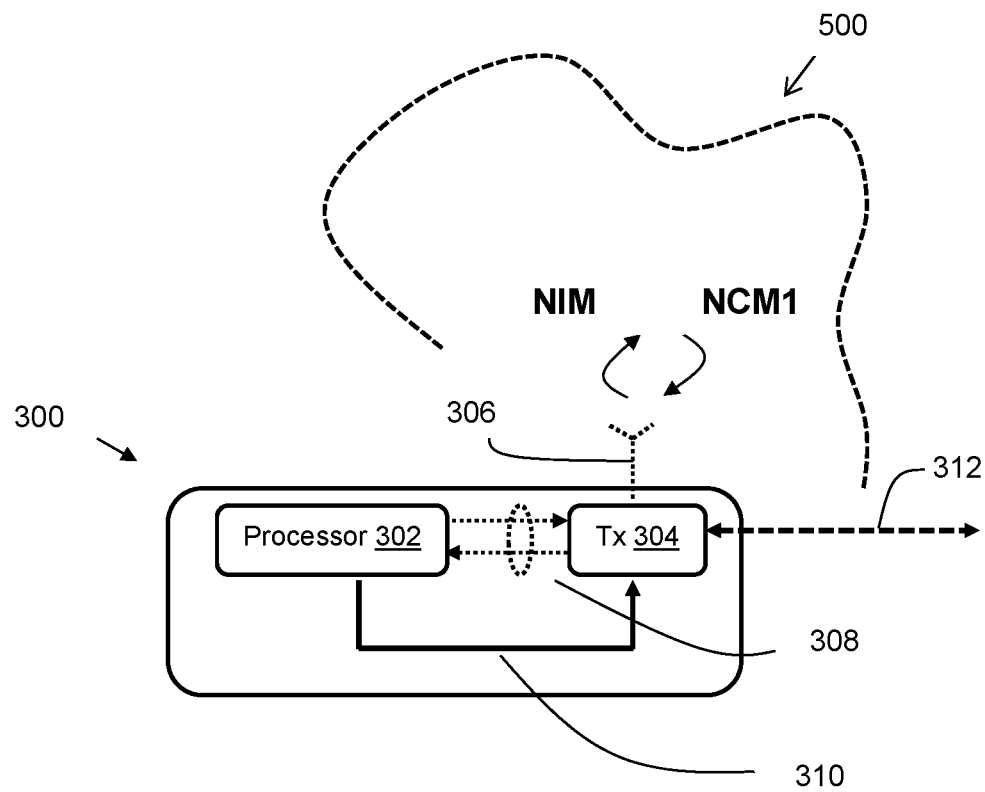
FIG. 3 shows a second network node according to an embodiment of the present disclosure.

FIG. 3 shows a second network node 300 according to an embodiment of the present disclosure. The second network node 300 comprises a processor 302 which is communicably coupled with communication means 308 to a transceiver 304 in this exemplary embodiment. The communication means 308 are illustrated as dotted arrows between the processor 302 and the transceiver 304 in FIG. 3. The communication means 308 are according to techniques well known in the art. The communication means 308 may e.g. be used for transfer of data or control signalling between the processor 302 and the transceiver 304. The second network node 300 in this particular embodiment further comprises control means 310 by which the processor 302 operates (or controls) the transceiver 304. The control means are illustrated with the black arrow from the processor 302 to the transceiver 304. The second network node 300 also comprises antenna means 306 coupled to the transceiver 304 for transmission in the wireless communication system 500. The second network node 300 may also optionally have wired communication means 312 by which the second network node 300 can communicate with other network nodes or other network entities. The wired communication means 312 may e.g. be part of a backhaul system of the wireless communication system 500.

According to the present solution, the processor 302 of the second network node 300 is configured to determine a set of third network nodes 300a, 300b, ..., 300z (see FIG. 7) configurable to (or contending to) use a shared communication channel for wireless communication. The transceiver 304 of the second network node 300 is configured to transmit a network information message NIM to a first network node 100. The network information message NIM indicates the set of third network nodes 300a, 300b, ..., 300z. The transceiver 304 is further configured to receive a first network control message NCM1 from the first network node 100 in response to transmitting the network information message. The first network control message NCM1 indicates at least one first channel access time interval for the second network node 300. The transceiver 304 is further configured to use (or access) the shared communication channel according to the first network control message NCM1.

Figure 4:
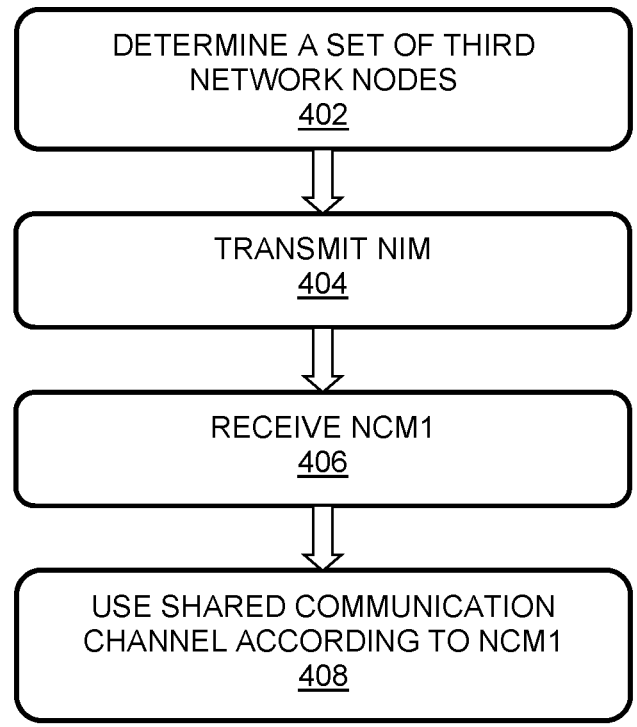
FIG. 4 shows another method according to an embodiment of the present disclosure.

FIG. 4 shows a corresponding method which may be implemented in a second network node 300, such as the one shown in FIG. 3. The method 400 comprises the step of determining 402 a set of third network nodes 300a, 300b, ..., 300z configurable to (or contending to) use a shared communication channel for wireless communication. The method 400 further comprises the step of transmitting 404 a network information message NIM to a first network node 100. The network information message NIM indicates the set of third network nodes 300a, 300b, ..., 300z. The method 400 further comprises the step of receiving 406 a first network control message NCM1 from the first network node 100. The first network control message NCM1 indicates at least one first channel access time interval for the second network node 300. The method 400 finally comprises the step of using 408 the shared communication channel according to the first network control message NCM1.

The set of third network nodes 300a, 300b, ..., 300z indicated by the network information message NIM may comprise a list of other network nodes identities whose transmission may collide with a transmission of the second network node 300. The second network node 300 and the set of third network nodes 300a, 300b, . . . , 300z are in one embodiment of the same type (e.g. operating in the same RAT), such as LTE base stations or access points in WLAN. However, in another embodiment the second network node 300 and the set of third network nodes 300a, 300b, . . . , 300z belong to different RATs. In addition, the set of third network nodes 300a, 300b, . . . , 300z indicated by the network information message NIM may comprise an indication of information related to contention relationships between the second network node and the set of third network nodes 300a, 300b, . . . , 300z. The information related to contention relationships may indicate any of transmission collisions between the second network node 300 and any network node in the set of third network nodes 300a, 300b, . . . , 300z, as well as the number of the collisions and the rate of their occurrence, the signal strength received form network nodes in the set of third network nodes 300a, 300b, . . . , 300z contending to use the same shared communication channel, the duration of the transmission of network nodes in the set of third network nodes 300a, 300b, . . . , 300z contending to use the same shared communication channel, etc.

For the exemplifying case of an IEEE 802.11 network formed by the second network node and the third network nodes, the set of third network nodes 300a, 300b, . . . , 300z comprises network access nodes whose transmission is received by the second network node 300 with RSS exceeding the CCA sensitivity threshold. Configuring the sensitivity threshold to different values compared to the default settings of the IEEE 802.11 will determine a different size of the set of conflicting network access nodes; namely, using a sensitivity threshold lower than a default configuration implies that more network access nodes can eventually be detected, thereby yielding a larger set of third network nodes 300a, 300b, . . . , 300z.

The network information message NIM transmitted by the second network node 300 to the first network node 100 may in one embodiment further comprise an indication of traffic load associated with the second network node 300 or the set of third network nodes 300a, 300b, . . . , 300z configurable or contending to use the same shared communication channel. In other words, the set of third network nodes 300a, 300b, . . . , 300z comprises network nodes whose transmission may collide with a transmission of second network node 300 in one or more shared radio channels (e.g. within an unlicensed frequency band). Thus, the indication of traffic load is also implicitly or explicitly associated with one or more shared radio channels. This enables the first network node 100 to weigh the relevance of different network nodes when determining channel access time intervals and the associated channel access priorities (more about channel access priorities in the following disclosure). In one example, network nodes with high traffic load can be granted a longer channel access time interval or higher channel access priority. Additionally, this has the advantage to enable the first network node 100 to determine the allocation of channel access time intervals and channel access priorities based on fairness criteria.

The network information message NIM transmitted by the second network node 300 to the first network node 100 may in one embodiment further comprise an indication of channel utilization or channel idle time associated with one or more shared radio channels (e.g. within an unlicensed frequency band). In the WLAN case the network information message NIM may further comprise an indication of WLAN channel utilization, number of stations, or available admission capacity. This enables the first network node 100 to estimate the channel usage in neighbourhood of the second network node 300 and determine accordingly the channel access time intervals and the associated channel access priorities for the second network node 300 and the set of third network nodes 300a, 300b, . . . , 300z whose transmission can possibly collide with a transmission of the second network node 300.

Further, the network information message NIM transmitted by the second network node 300 may further comprise an indication of interference associated with one or more radio communication channels (e.g. within an unlicensed frequency band).

The present first network node 100 and the second network node 300 may be a (radio) network node or an access node or a network access node or an access point or a base station, e.g., a Radio Base Station (RBS), which in some radio networks may be referred to as transmitter, "eNB", "eNodeB", "NodeB" or "B node", depending on the technology and terminology used. The radio network nodes may be of different classes such as, e.g., macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM).

In one embodiment of the present disclosure, the first network node 100 can be configured to receive a network information message NIM from a second network node 300 associated with a shared communication channel and to determine whether the shared communication channel is congested or non-congested based on the network information message NIM. Additionally, the first network node 100 may use the said determination to determine a further shared communication channel to be used by the second network node 300 when the shared communication channel is determined to be congested. In one exemplifying case, the shared communication channel is determined to be congested if the network information message NIM reports a channel utilization that exceed a threshold value. Alternatively, a shared communication channel may be determined as congested based on the number of user devices and/or network nodes contending to access the shared communication channel. Other definition of a congested shared communication channel can be envisaged based on different parameters, such as channel idle time, traffic load, interference, etc.

In one embodiment of the present disclosure, the first network node 100 can be configured to operate with (or belongs to) a first RAT, whilst the second network node 300 and the set of third network nodes 300a, 300b, . . . 300z are configurable to operate (or belong) to a second RAT. In one exemplifying case, the downlink user data plane is transmitted over the second RAT (i.e., by the network access nodes) whilst the uplink user data plane is transmitted over the first RAT. Additionally, the first RAT can operate in licensed band, such as a LTE network, whilst the second RAT operates in unlicensed spectrum bands, such as WiFi or LAA as described previously.

In one further embodiment of the present disclosure, the first network node 100 is a network node of an LTE network, such as a LTE eNB, or a network control node of an LTE network, such as an LTE eNB, Mobility Management Entity (MME) node, or a Operations and Management (OAM) node, whilst the second network node 300 and the set of third network nodes 300a, 300b, . . . , 300z are APs operating in unlicensed spectrum in compliance with one of the IEEE 802.11 family of standards. In this case, the network information message NIM transmitted from the second network node 300 to the first network node 100, as well as the first network control message NCM1 transmitted from the first network node 100 to the second network node 300, are transmitted within a network interface between an LTE network and an IEEE 802.11 compliant network. The advantage of this embodiment is to enable an efficient interworking between LTE and an IEEE 802.11 compliant network, such as a WiFi network, with the under laying WiFi network being controlled and configurable by the overlay LTE network.

In one further embodiment of the present disclosure, the first network node 100 is a network node of an LTE network, such as a LTE eNB, or a network control node of an LTE network, such as an LTE eNB, MME node, or a OAM node, whilst the second network node 300 and the set of third network nodes 300a, 300b, . . . , 300z are LTE small cell nodes operating in unlicensed frequency spectrum according to an LTE standard. In this case, the network information message NIM transmitted from the second network node 300 to the first network node 100, as well as the first network control message NCM1, transmitted from the first network node 100 to a second network node 300, can be transmitted within the X2 interface.

In one further embodiment of the present disclosure, a CCA-incidence matrix $A=[a_{n,j}]$ with entries $a_{n,j}=1$ if the RSS at access point n from access point j exceeds the CCA sensitivity threshold and zero otherwise is considered. The CCA-incidence matrix A represents contention relationships between network nodes configurable or contending to use the same shared communication channel. In this terminology, assuming the second network node 300 is indexed by an index n, the set of third network nodes 300a, 300b, . . . 300z whose transmissions potentially collide with a transmission from the second network node 300 comprises the entries of n-th row of the CCA-incidence matrix equal to 1. Therefore, according to a previous embodiment, the second network node 300 signals to the first network node 100 the value $a_{n,j}$ corresponding to a set of third network nodes 300a, 300b, . . . 300z configured or contending to use the same shared communication channel.

Based on the CCA-incidence matrix, the first network node 100 determines a normalized channel access time interval $t_n \in [0,1]$ for a group of network nodes, including the second network node 300 and the set of third network nodes 300a, 300b, . . . 300z, i.e. network nodes with indices n=1, . . . , N operating in the same shared communication channel within an unlicensed frequency band by solving the following optimization problem (designated as problem (1) later on):

$$\text{maximize} \sum_{n=1}^{N} w_n u_n(t_n) \qquad (1)$$

$$\text{subject to} \sum_{j=1}^{N} b_{n,j} t_j = 1, \forall n$$

$$t_n \in [0, 1] \; \forall n,$$

where $w_n$ is a weight associated with the second network node n, and $u_n(\cdot)$ is a utility function associated with the second network node n, such as $u_n(t_n)=\log(t_n)$ to assures a proportionally fair allocation of time among access points or $u_n(t_n)=t_n$. The constraint matrix $B=[b_{n,j}]$ is a function of or dependent on CCA-incidence matrix A, i.e. $b=f(A)$, such that the coefficients $b_{n,j}$ defines a proper set of constraints on the normalized transmission time of a group of network nodes operating in the same shared communication channel that can sense each other. In one example, B=I+A where I is an identity matrix. The optimization problem (1) above can be solved with state-of-the-art optimization toolboxes or via standard Lagrange duality theory or with any other suitable solution.

Given the normalized channel access time coefficients $t_n$, a heuristic algorithm can be used to determine the channel access time intervals $T_{n,k}$ for each network node. In one example, $T_{n,k}$ can implicitly be determined with a heuristic algorithm that computes suitable starting and ending points of the channel access time interval $T_{n,k}$ wherein each network node is granted the highest channel access priority. Thereby, the first network control message NCM1 (or the second network control message NCM2) comprises any of: a start channel access time, an end channel access time, a start channel access time offset with respect to a reference time, a channel access duration, and a channel access periodicity.

In one embodiment of the present disclosure, the processor 102 of the first network node 100 further is configured to determine at least one first channel access priority associated with the first channel access time interval based on the network information message NIM. The transceiver 104 of the first network node 100 is further configured to transmit the first network control message NCM1 further indicating the first channel access priority to the second network node 300. Additionally, different channel access priorities and channel access time intervals can be determined for different network nodes.

The channel access time intervals and the associated channel access priorities determined by the first network node 100 for the second network node 300 may comprise a set of K channel access time intervals $\{T_{n,k}\}_{k=1}^{K}$ and K channel access priorities $\{p_{n,k}\}_{k=1}^{K}$ associated with each channel access time interval. The combination of channel access time intervals configured for the second network node 300 can be regarded as a channel access duty cycle period $H_n$ such as $H_n = \sum_{k=1}^{K} T_{n,k}$ (as also referred to as time horizon) for the second network node 300. Thereby, upon the second network node 300 receives a configuration of one or more channel access time intervals and channel access priorities within a time horizon $H_n$, the configuration is repeatedly applied over time with periodicity $H_n$ until a new configuration is received according to an embodiment. In one exemplifying case, the same time horizon H is used for a plurality of network nodes, i.e., $H_n=H$ for all network nodes n=1, . . . , N.

In one embodiment of the present disclosure, the channel access priority represents the probability $p_{n,k} \in [0,1]$ of the second network node 300 accessing a channel c within the channel access time interval upon detecting that the channel is free. In other words, upon completing a listen before talk procedure during a channel access time interval $T_{n,k}$ (e.g., the clear channel assessment and backoff countdown in IEEE 802.11), the second network node 300 may start the transmission of data (e.g. a data frame) with probability $p_{n,k}$. If $p_{n,k}=1$ for the second network node 300 and $p_{j,k}=0$ for all potentially colliding network nodes j (i.e. belonging to the set of third network nodes) within the channel access time interval $T_{n,k}$, then the second network node 300 is granted exclusive access to the shared communication channel within the channel access time interval $T_{n,k}$. On the other hand, if $p_{n,k}=1$ and $p_{j,k}>0$ (but sufficiently small), then the second network node 300 is granted non-exclusive channel access priority over other network nodes within the channel access time interval $T_{n,k}$. An advantage of this embodiment is that if the second network node 300 and a potentially colliding network node j simultaneously fulfil the conditions to access the shared communication channel (and thereby collide), potentially colliding network node j would defer its transmission with probability $1-p_{j,k}$ (close to 1), thereby avoiding a collision. On the other hand, if the second network node 300 does not have a data frame to transmit within the channel access time interval $T_{n,k}$, a potentially colliding network node j could opportunistically access the channel with probability $1-p_{j,k}$, thereby improving the network spectral efficiency.

When probability $p_{n,k}$ is strictly positive (i.e., $p_{n,k}>0$) and the backoff timer of the second network node 300 expires but the second network node 300 draws a value 0 for accessing the channel, i.e., implying not to transmit data despite the channel being free, the second network node 300 could restart the backoff procedure, i.e., draw a new random value of the backoff timer and defer the transmission until the new backoff counter expires.

In an exemplifying embodiment of the present disclosure, the channel access priority for a second network node 300 within a channel access time interval is represented by one or more of:

A configuration of the backoff window value to be used during a channel access time interval $T_{n,k}$ in a channel c in an unlicensed frequency band;

A configuration of the current value of the backoff counter to be used during a channel access time interval $T_{n,k}$ in a channel c in an unlicensed frequency band;

A probability distribution function for drawing new values of the backoff counter between zero and the current value of the backoff window CW during a channel access time interval $T_{n,k}$ in a channel c in an unlicensed frequency band.

In particular, by configuring a large (respectively, a small) backoff window or the current value of the backoff counter, the second network node 300 is given lower (respectively, higher) priority to access a channel within the channel access time interval $T_{n,k}$. The advantage of this is that the resulting medium access scheme is backward compatible with the IEEE 802.11 MAC. Alternatively, the second network node 300 can be given lower (respectively, higher) priority to access a shared communication channel within the channel access time interval $T_{n,k}$ by configuring the second network node 300 with a probability distribution function for drawing new values of the backoff counter between 0 and the current value of the backoff window CW, wherein the probability distribution mass is concentrated toward values closer to CW (respectively, closer to 0), so that the second network node 300 will draw large (respectively, small) values of the backoff counter with higher probability.

In one embodiment of the present disclosure, the second network node 300 is configured with a channel access probability strictly positive but less than 1, i.e., $p_{n,k} \in (0,1)$, within a channel access time interval wherein another potentially colliding network node is given higher channel access priority, namely a prioritized network node. The second network 300 is thus configured to:

Receive a first network control message NCM1 further comprising a minimum channel idle threshold $t_{n,idle}$ from the first network node 100;

Assess whether the shared communication channel is used by the prioritized network node; and If the shared communication channel is not utilized by the prioritized network node for a channel idle time $t_{n,idle}$, transmit data either with probability $p_{n,k}$ or with probability one.

This embodiment fully corresponds to the case that the transceiver 304 of the second network node 300 further is configured to use the shared communication channel according to the first network control message NCM1 if the shared communication channel is determined to be free for an interval of time at least equal to the first channel idle time threshold.

The discriminating factor between accessing the channel with probability $p_{n,k}$ or 1 can be determined by standardization procedures, e.g., whether to uses $p_{n,k}$ at the second network node 300 is mandatory or not. An advantage of this embodiment is to enable the second network node 300 to transmit data when prioritized network access nodes do not any have data to transmit in the corresponding prioritized channel access time intervals. Thereby, spectral efficiency can be improved by this solution.

The minimum channel idle threshold $t_{n,idle}$ could be configured by the first network node 100 based on the network information messages NIM received from the second network node 300. In one example, when the second network node 300 reports a long channel idle time, the first network node 100 could reduce minimum channel idle threshold $t_{n,idle}$ to let the second network node 300 opportunistically access the shared communication channel during channel access time intervals wherein other network nodes have prioritized access.

In one embodiment of the present disclosure, the first network node 100 determines a configuration of channel access time intervals and channel access priority for the second network node 300 in one shared communication channel based on one or more in the group of:

An indication of traffic load for the second network node 300;

An indication of traffic load of the set of third network nodes 300a, 300b, . . . , 300z operating in the same shared communication channel.

In the terminology of problem (1), this is accomplished by weighing each network node by a parameter $w_n$ that can depend upon traffic load $q_n$, such as one of $$w_n = \frac{q_n}{q_n + \sum_{j=1}^{N} a_{n,j} q_j}$$

$$w_n = \frac{q_n}{\sum_{j=1}^{N} b_{n,j} q_j},$$

wherein the traffic load $q_n$ associated to the second network node n is normalized by the sum of the traffic loads $q_j$ of network nodes n=1, . . . , N whose transmissions may collide with a transmission of the second network node n (i.e., the traffic load associated with set of third network nodes 300a, 300b, . . . , 300z).

Figure 5:
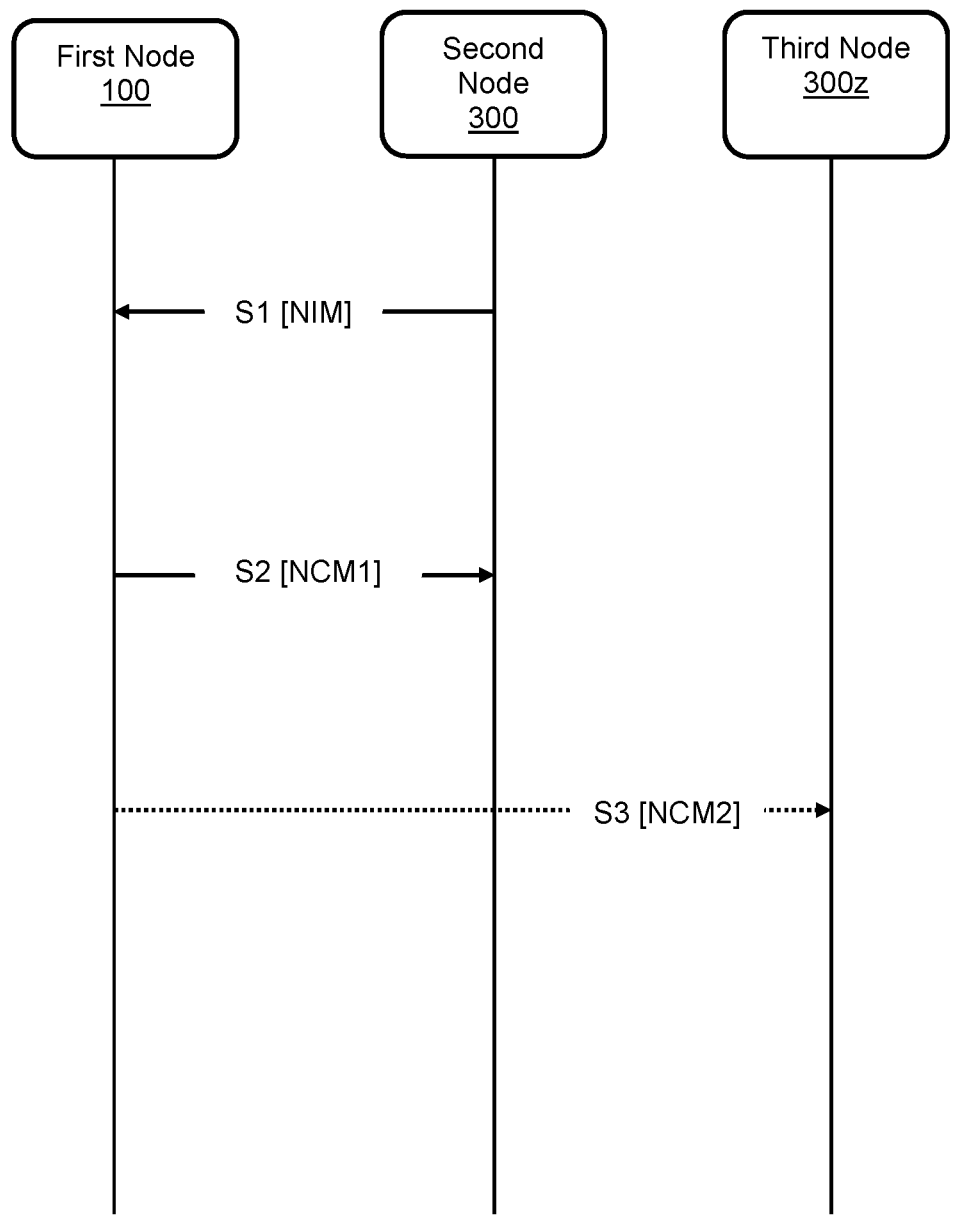
FIG. 5 illustrates signalling aspects of embodiments of the present disclosure.

FIG. 5 illustrates signalling aspects of embodiments of the present disclosure. It is shown in FIG. 5 how a first (communication) signal S1 is transmitted from the second network node 300 to the first network node 100. The first signal S1 comprises a network information message NIM indicating at least a set of third network nodes 300a, 300b, . . . , 300z contending to use the shared communication channel. Further, the first network node 100 is configured to transmit a second signal S2 to the second network node 300. The second signal S2 comprises a first network control message NCM1 indicating at least a first channel access time interval. FIG. 5 also shows the optional case when the first network node 100 transmits a third signal S3 to at least one third network node 300z belonging to the set of third network nodes 300a, 300b, ..., 300z. The third signal S3 comprises a second network control message NCM2 indicating at least one second channel access time interval for the at least one third network node 300z.

Therefore, according to an embodiment of the present disclosure the processor 102 of the first network node 100 further is configured to determine, for at least one third network node belonging to the set of third network nodes 300a, 300b, ..., 300z, at least one second channel access time interval based on the network information message NIM. The transceiver 104 of the first network node 100 is further configured to transmit a second network control message NCM2 to the third network node. The second network control message NCM2 indicates the second channel access time interval.

Figure 6A:
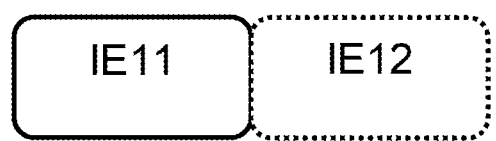
FIGS. 6a and 6b show exemplary a network information message and a network control message.
Figure 6B:
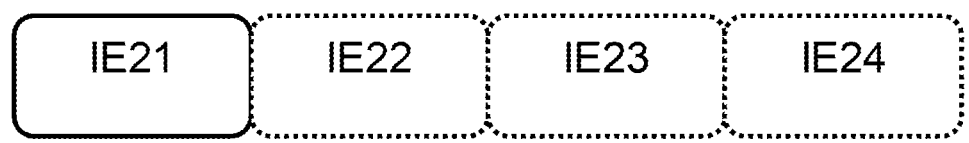

Furthermore, FIGS. 6a and 6b show an exemplary network information message NIM and network control messages NCM1/NCM2 according to embodiments of the present disclosure.

In FIG. 6a the network information message NIM comprises information element IE11 which is indicating the set of third network nodes 300a, 300b, ..., 300z configurable or contending to use the shared communication channel for wireless communication as described above. Optionally, according to a further embodiment of the present disclosure, the network information message NIM comprises an additional information element IE12 indicating the traffic load of the shared communication channel and/or the traffic load of the second network node 300 in the shared communication channel. Additionally, the network information message NIM may comprise an information element indicating contention relationship between the second network node 300 and the set of third network nodes 300a, 300b, ..., 300z configurable or contending to use the shared communication channel for wireless communication.

In FIG. 6b the first network control message NCM1 comprises information element IE21 indicating the first channel access time interval. Also for the first network control message NCM1 additional optional information elements are comprised in the first network control message NCM1 according to embodiments of the present disclosure.

Information element IE22 indicates a first channel access priority for the second network node 300. Therefore, according to an embodiment of the present disclosure the processor 102 of the first network node 100 is further configured to determine at least one first channel access priority associated with the first channel access time interval based on the network information message NIM. The transceiver 104 is further configured to transmit the first network control message NCM1 further indicating the first channel access priority. The first channel access priority e.g. grants a channel access probability p between 0 and 1. The channel access priority may be represented in a number of different message configurations. In one exemplary embodiment, the channel access priority is represented as a backoff window value associated with the channel access time interval or the shared communication channel. In another exemplary embodiment, the channel access priority is represented as a backoff counter associated with the channel access time interval or the shared communication channel. In yet another exemplary embodiment, the channel access priority is represented as a probability distribution function of a backoff counter associated with the channel access time interval or the shared communication channel.

Information element IE23 indicates a first channel idle time threshold for the second network node 300. Therefore, according to an embodiment of the present disclosure the processor 102 of the first network node 100 is further configured to determine, for the second network node 300, at least one first channel idle time threshold based on the network information message NIM. The transceiver 104 is further configured to transmit the first network control message NCM1 further indicating the first channel idle time threshold.

Information element IE24 indicates a determined shared communication channel for the second network node 300. Therefore, according to an embodiment of the present disclosure the processor 102 of the first network node 100 is further configured to determine at least one shared communication channel for the second network node 300 based on the network information message NIM. The transceiver 104 is further configured to transmit the first network control message NCM1 further indicating the determined shared communication channel.

According to an embodiment of the present disclosure, the processor 102 of the first network node 100 is further configured to derive channel contention relations between the second network node 300 and the set of third network nodes 300a, 300b, ..., 300z based on the network information message NIM. The processor 102 is further configured to determine any of the first channel access time interval, the first channel access priority, the first channel idle time threshold, and the determined shared communication channel based on the derived channel contention relations and the network information message NIM.

According to further embodiments of the present disclosure, the processor 102 of the first network node 100 is further configured to determine for at least one third network node 300z of the set of third network nodes 300a, 300b, ..., 300z one or more of:
  at least one second channel access time interval based on the network information message NIM;
  at least one second channel access priority associated with the second channel access time interval based on the network information message NIM;
  at least one channel idle time threshold based on the network information message NIM;
  at least one shared communication channel based on the network information message NIM;
  any of the second channel access time interval, the second channel access priority, the second channel idle time threshold, and the determined shared communication channel based on the above described derived channel contention relations and the network information message NIM.

Accordingly, the transceiver 104 of the first network node 100 is further configured to transmit the second network control message NCM2 further indicating one or more of:
  the second channel access time interval;
  the second channel access priority;
  the second channel idle time threshold;
  the determined shared communication channel.

Figure 7:
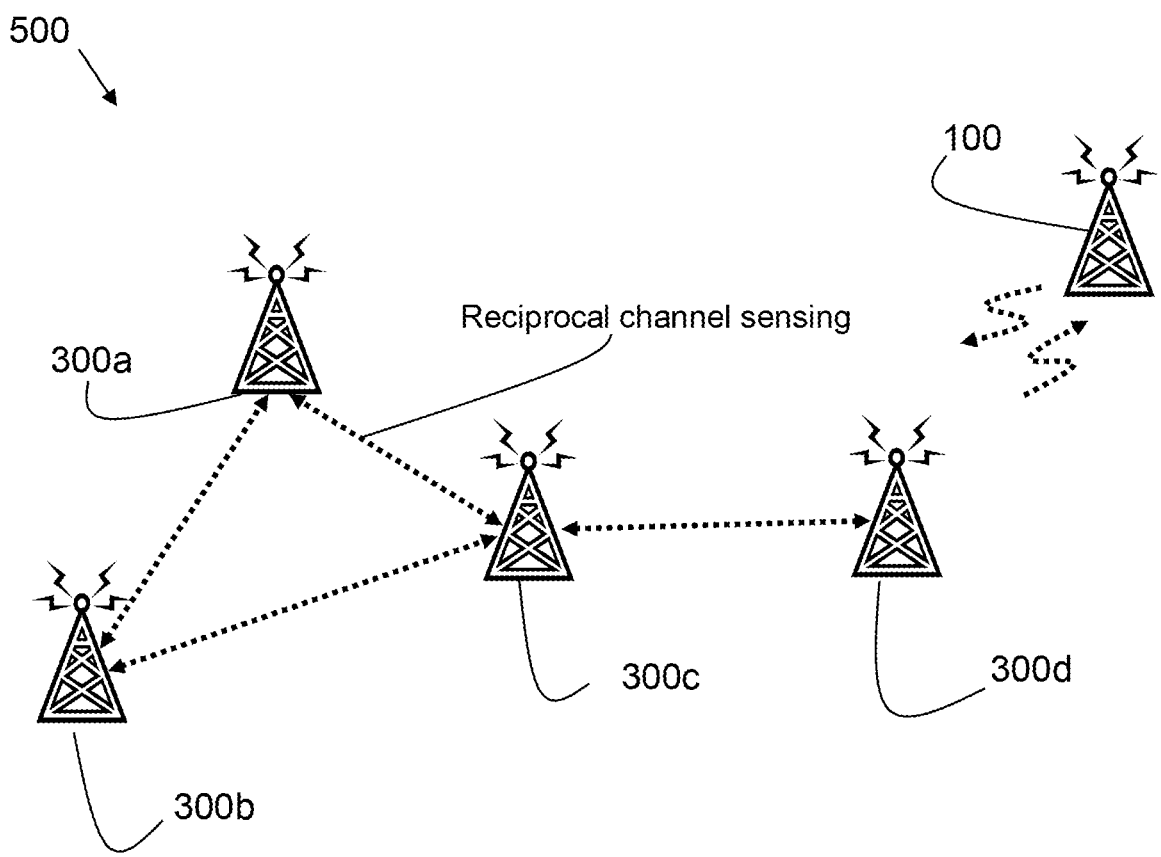
FIG. 7 shows an example of a wireless communication system with exclusive channel access in one channel access time interval per network node within a duty cycle H.
Figure 7:
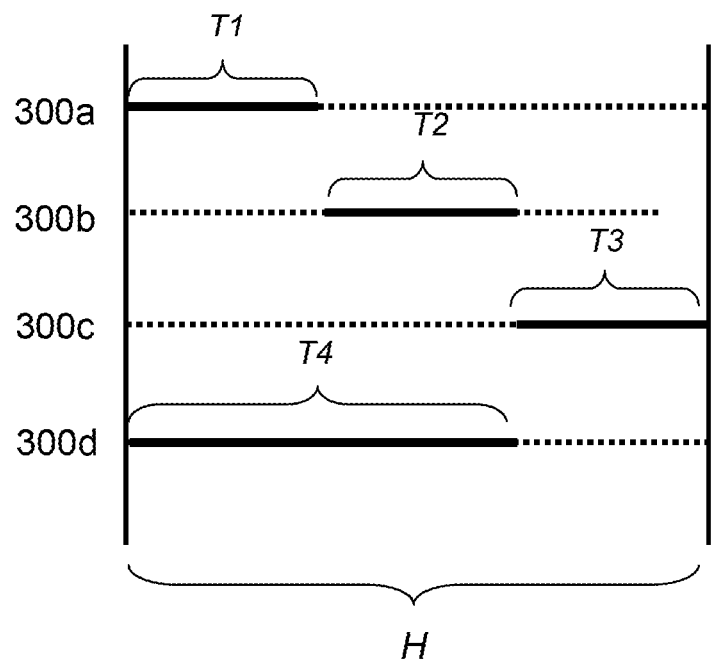

FIG. 7 shows an exemplary wireless communication system 500 according to an embodiment of the present disclosure. In this example the network nodes are given exclusive channel access in one channel access time interval per network node within a duty cycle H. FIG. 7 shows the example when network nodes 300a, 300b, 300c, 300d are granted exclusive channel access in one channel access time interval of a duty cycle period H, (i.e., no channel access in the rest of the duty cycle period). The channel access is granted by the first network node 100. In the example in FIG. 7, network node 300a, network node 300b, and network node 300c receive RSS≥−82 dBm from each other, and network node 300d receives RSS above the CCA threshold only from the network node 300c. In this case, the solution to problem (1) assuming B=I+A is to enable all network nodes to access the channel for at most ¼ the duty cycle H. With a different choice of H, one can achieve up to 75% higher exclusive channel access time. In this example, network nodes 300a, 300b and 300c cannot transmit at the same time, however one of network nodes 300a and 300b can transmit at the same time as network node 300d which is the case during time period T4. Since network node 300c interferes with all the other network nodes, only network node 300c is allowed to transmit during a time period which is the case during time period T3. The solution could reside on top of existing medium access schemes, thereby being compatible with state of the art access protocols for unlicensed spectrum, such as the IEEE 802.11 MAC.

Furthermore, any methods according to embodiments of the present disclosure may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the network nodes comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present network node may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the embodiments described above, but also relates to and incorporates all embodiments within the scope of the appended independent claims.

What is claimed is:

1. A first network node for a wireless communication system, the first network node comprising:
    a transceiver configured to receive a network information message from a second network node, wherein the network information message indicates a set of third network nodes configurable to use a shared communication channel for wireless communication, and wherein the second network node is configured to use the shared communication channel for wireless communication; and
    a processor configured to determine, for the second network node, a first channel access time interval for accessing the shared communication channel based on the network information message;
    wherein the transceiver further is configured to transmit a first network control message to the second network node, the first network control message indicating the first channel access time interval for accessing the shared communication channel.

2. The first network node according to claim 1, wherein the network information message further indicates a traffic load of the shared communication channel or a traffic load of the second network node in the shared communication channel.

3. The first network node according to claim 1,
    wherein the processor further is configured to:
        determine at least one further shared communication channel for the second network node based on the network information message, and
        determine at least one further channel access time interval for accessing the at least one further shared communication channel based on the network information message;
    wherein the transceiver further is configured to:
        transmit the first network control message indicating the at least one further shared communication channel and the at least one further channel access time interval for accessing the at least one further shared communication channel.

4. The first network node according to claim 1,
    wherein the processor further is configured to determine at least one first channel access priority associated with the first channel access time interval based on the network information message; and
    wherein the transceiver further is configured to transmit the first network control message further indicating the at least one first channel access priority.

5. The first network node according to claim 4, wherein the at least one first channel access priority grants a channel access probability p between zero and one.

6. The first network node according to claim 1,
    wherein the processor further is configured to determine, for the second network node, at least one first channel idle time threshold based on the network information message; and
    wherein the transceiver further is configured to transmit the first network control message further indicating the at least one first channel idle time threshold.

7. The first network node according to claim 1, wherein the processor further is configured to:
    derive channel contention relations between the second network node and the set of third network nodes based on the network information message; and
    determine one or more of a first channel access time interval, a first channel access priority, a first channel idle time threshold, and the shared communication channel based on the derived channel contention relations and the network information message.

8. The first network node according to claim 1,
wherein the processor further is configured to determine, for at least one third network node belonging to the set of third network nodes, at least one second channel access time interval for accessing the shared communication channel based on the network information message; and
wherein the transceiver further is configured to transmit a second network control message to the at least one third network node, the second network control message indicating the second channel access time interval.

9. The first network node according to claim 1, wherein the first network node is configured to operate in a first radio access technology (RAT) and the second network node is configured to operate in a second RAT.

10. The first network node according to claim 1, wherein the first network node is configured to operate in a licensed frequency band and the second network node is configured to operate in an un-licensed frequency band.

11. A second network node for a wireless communication system, the second network node comprising
a processor configured to determine a set of third network nodes configurable to use a shared communication channel for wireless communication; and
a transceiver configured to:
transmit a network information message to a first network node, the network information message indicating the set of third network nodes;
receive a first network control message from the first network node, the first network control message indicating a first channel access time interval for accessing the shared communication channel by the second network node based on the network information message; and
use the shared communication channel according to the first network control message.

12. The second network node according to claim 11,
wherein the processor further is configured to determine at least a traffic load of the shared communication channel or a traffic load of the second network node in the shared communication channel; and
wherein the transceiver further is configured to transmit the network information message further indicating the traffic load of the shared communication channel or the traffic load of the second network node in the shared communication channel.

13. The second network node according to claim 11, wherein the first network control message further indicates at least one channel access priority associated with the first channel access time interval.

14. The second network node according to claim 11,
wherein the first network control message further indicates a first channel idle time threshold; and
wherein the transceiver further is configured to use the shared communication channel according to the first network control message in response to the processor determining that the shared communication channel is free for an interval of time at least equal to the first channel idle time threshold.

15. The second network node according to claim 11, wherein the first network node is configured to operate in a first radio access technology (RAT), and the second network node is configured to operate in a second RAT.

16. The second network node according to claim 11, wherein the first network node is configured to operate in a licensed frequency band and the second network node is configured to operate in an un-licensed frequency band.

17. A method for a wireless communication system, the method comprising:
receiving a network information message from a second network node, wherein the network information message indicates a set of third network nodes configurable to use a shared communication channel for wireless communication, and wherein the second node is configured to use the shared communication channel for wireless communication;
determining, for the second network node, a first channel access time interval for accessing the shared communication channel based on the network information message; and
transmitting a first network control message to the second network node, the first network control message indicating the first channel access time interval for accessing the shared communication channel.

18. The method according to claim 17, wherein the network information message further indicates a traffic load of the shared communication channel or a traffic load of the second network node in the shared communication channel.

19. A method for a wireless communication system, the method comprising:
determining a set of third network nodes configurable to use a shared communication channel for wireless communication;
transmitting a network information message to a first network node, the network information message indicating the set of third network nodes;
receiving a first network control message from the first network node, the first network control message indicating a first channel access time interval for accessing the shared communication channel by the second network node according to the first network control message; and
using the shared communication channel according to the first network control message.

20. The method according to claim 19, wherein the first network control message further indicates at least one channel access priority associated with the first channel access time interval.

* * * * *